United States Patent
Hansson et al.

(10) Patent No.: US 6,974,281 B2
(45) Date of Patent: Dec. 13, 2005

(54) TOOL FOR CHIP REMOVING MACHINING

(75) Inventors: Per Hansson, Gävle (SE); Jörgen Wiman, Sandviken (SE); Sture Sjöö, Gävle (SE)

(73) Assignee: Sandvik AB, Sandviken (SE)

( * ) Notice: Subject to any disclaimer, the term of this patent is extended or adjusted under 35 U.S.C. 154(b) by 39 days.

(21) Appl. No.: 10/229,154

(22) Filed: Aug. 28, 2002

(65) Prior Publication Data

US 2003/0059264 A1    Mar. 27, 2003

(30) Foreign Application Priority Data

Aug. 31, 2001 (SE) .................................. 0102900

(51) Int. Cl.⁷ .............................................. B23B 27/16
(52) U.S. Cl. ...................................... 407/66; 407/103
(58) Field of Search .................... 407/66, 113, 114, 407/67, 30, 35, 40, 103

(56) References Cited

U.S. PATENT DOCUMENTS

| | | | |
|---|---|---|---|
| 3,907,016 A | * | 9/1975 | Nicholson et al. .......... 144/172 |
| 4,893,967 A | * | 1/1990 | Briese ........................... 407/7 |
| 5,004,379 A | | 4/1991 | Little |
| 5,555,784 A | | 9/1996 | Muendlein et al. |
| 6,146,060 A | * | 11/2000 | Rydberg et al. .............. 407/40 |
| 6,146,061 A | | 11/2000 | Larsson |

FOREIGN PATENT DOCUMENTS

| | | |
|---|---|---|
| DE | 197 01 555 | 7/1998 |
| EP | 1 129 805 | 9/2001 |
| GB | 2 021 992 | 12/1979 |

* cited by examiner

Primary Examiner—Willmon Fridie, Jr.
(74) Attorney, Agent, or Firm—Drinker Biddle & Reath LLP

(57) ABSTRACT

A tool for chip removing machining includes an insert holder and a cutting insert attached thereto. The holder includes a longitudinal center axis and terminates in a support surface at a front end of the holder. The support surface defines a seat to which the insert is removably attached. The support surface forms a 45-degree angle with the center axis. The cutting insert includes a contact surface for mounting the insert to the seat, and a plurality of fingers projecting generally radially with respect to the center axis. Each finger includes a cutting edge and an associated chip surface.

6 Claims, 8 Drawing Sheets

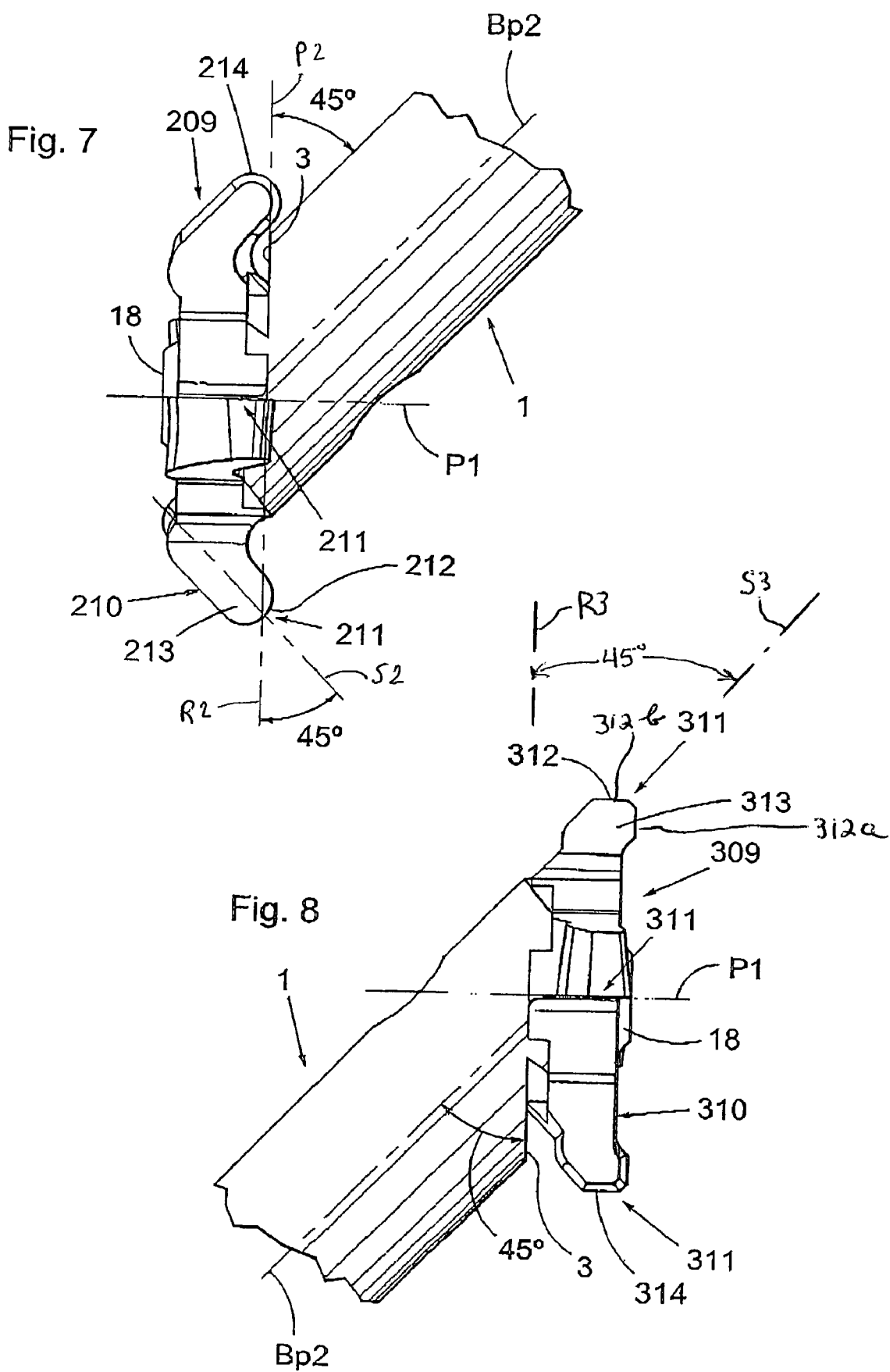

TOOL FOR CHIP REMOVING MACHINING

This application claims priority under 335 U.S.C. §§119 and/or 365 to patent application Ser. No. 0102900-8 filed in Sweden on Aug. 31, 2001, the entire content of which is hereby incorporated by reference.

TECHNICAL FIELD OF THE INVENTION

The present invention relates to a tool for chip removing machining including an insert holder, a cutting insert as well as members for clamping the cutting insert on the insert holder. The invention also relates separately to the cutting insert that is included in the tool according to the invention.

PRIOR ART

A device for clamping cutting inserts for metal cutting machining is previously known from Swedish Patent 511390 (corresponding U.S. Pat. No. 6,146,061). In that connection, an embodiment shows a cutting insert which is provided with four cutting edges as well as grooves on the side of the cutting insert which is intended to abut against the insert seat, whereby said grooves are intended to co-operate with ridges on the insert seat. The cutting edges are generally situated in the main plane of the cutting insert.

A thread-cutting insert is previously known from U.S. Pat. No. 5,004,379, which has four edges situated in the symmetrical main plane of the cutting insert. The cutting insert also has two side surfaces, which are intended to abut against an insert seat, and consequently the cutting insert has, in principle, eight active edges.

A tool where the interface between a front and a rear part of the insert holder of the tool leans 45° relative to the longitudinal center axis of the insert holder is previously known from WO 93/10929 (corresponding U.S. Pat. No. 5,555,784). The interface is provided with ridged teeth.

AIMS AND FEATURES OF THE INVENTION

A primary aim of the present invention is to provide a tool for chip removing machining, as well as a cutting insert associated therewith, which tool in a user-friendly way may be utilized for external as well as internal machining.

Yet another aim of the present invention is that the cutting insert normally should have a long service life thanks to the same having a plurality of cutting edges, which enable indexing of the cutting insert during the chip removing machining.

An additional aim of the present invention is to provide a firm anchorage of the cutting insert in the appurtenant insert seat.

At least the primary aim of the present invention is achieved by a tool for chip removing machining which comprises an insert holder and a cutting insert attached thereto. The holder includes a longitudinal center axis and terminates in a support surface at a front end of the holder. The support surface defines a seat to which the insert is removably attached. The support surface forms a 45° angle with the center axis.

The invention also pertains to a cutting insert for chip removing machining, the insert comprising a mounting portion for mounting to a holder. A cutting edge is spaced from the mounting portion, and a chip surface is disposed adjacent the cutting edge. A center through-hole extends through the mounting portion and defines a longitudinal axis. A plane containing both the chip surface and the cutting edge extends longitudinally through the mounting portion adjacent the axis.

Preferably, the insert includes fingers projecting from the mounting portion in generally radial directions with respect to the axis. Each finger includes a cutting edge disposed on an outer end thereof, and a chip surface disposed adjacent the cutting edge.

BRIEF DESCRIPTION OF THE DRAWINGS

Below, a number of embodiments of the invention will be described, references being made to the accompanying drawings, where:

FIG. 7 shows a side view of a second embodiment of a tool according to the present invention.

FIG. 8 shows a side view of a third embodiment of a cutting insert according to the present invention.

DETAILED DESCRIPTION OF PREFERRED EMBODIMENTS OF THE INVENTION

Figure 1:
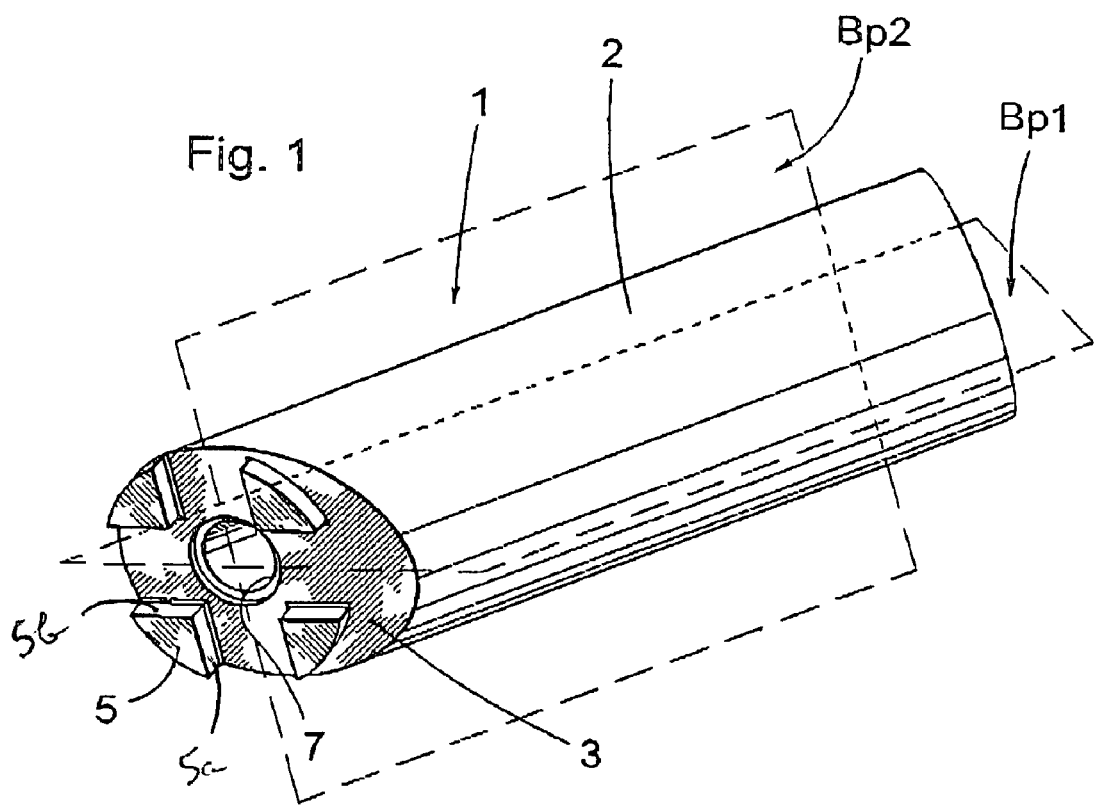
FIG. 1 shows a perspective view of an insert holder which, in principle, may be common for all the illustrated tool embodiments according to the present invention depicted in FIGS. 3–9.

The insert holder 1 illustrated in FIG. 1 is, in principle, common for all embodiments of cutting insert described below in connection with FIGS. 3–9. The insert holder 1 comprises a shaft portion 2 as well as a support surface 3, which defines the insert seat for the different cutting inserts which the insert holder 1 is intended to carry. The surface 3 is inclined at a 45-degree angle to a longitudinal center axis of the shaft portion. In particular, in FIG. 1, a first basal plane Bp1 and a second basal plane Bp2 are drawn in, which intersect along a center axis of the holder and form a right angle with each other. The second basal plant Bp2 intersects the surface 3 intermediate frontmost and rearmost portions 3f, 3r thereof, whereas the first basal plane Bp1 intersects the surface 3 and contains the frontmost and rearmost portions 3f, 3r. The support surface 3 forms an angle of 45° with the second basal plane Bp2 of the insert holder 1, which is seen more clearly in FIG. 2. This entails that the support surface 3 is in the form of an ellipse. As may be seen in FIG. 1, the support surface 3 is provided with engagement members in the form of a number of shoulders 5 (in the illustrated embodiment, four shoulders), each of which is in the form of a wedge having two faces 5a, 5b which intersect one another adjacent the center axis to form a right angle. In the support surface 3, a threaded first hole 7 is formed which is intended to receive a clamping screw for a cutting insert, see below. The shoulders 5 are arranged symmetrically relative to the first hole 7. The shoulders 5 have the function of co-operating with complimentarily formed countersinks on a cutting insert. This will be described more closely below.

Figure 2:
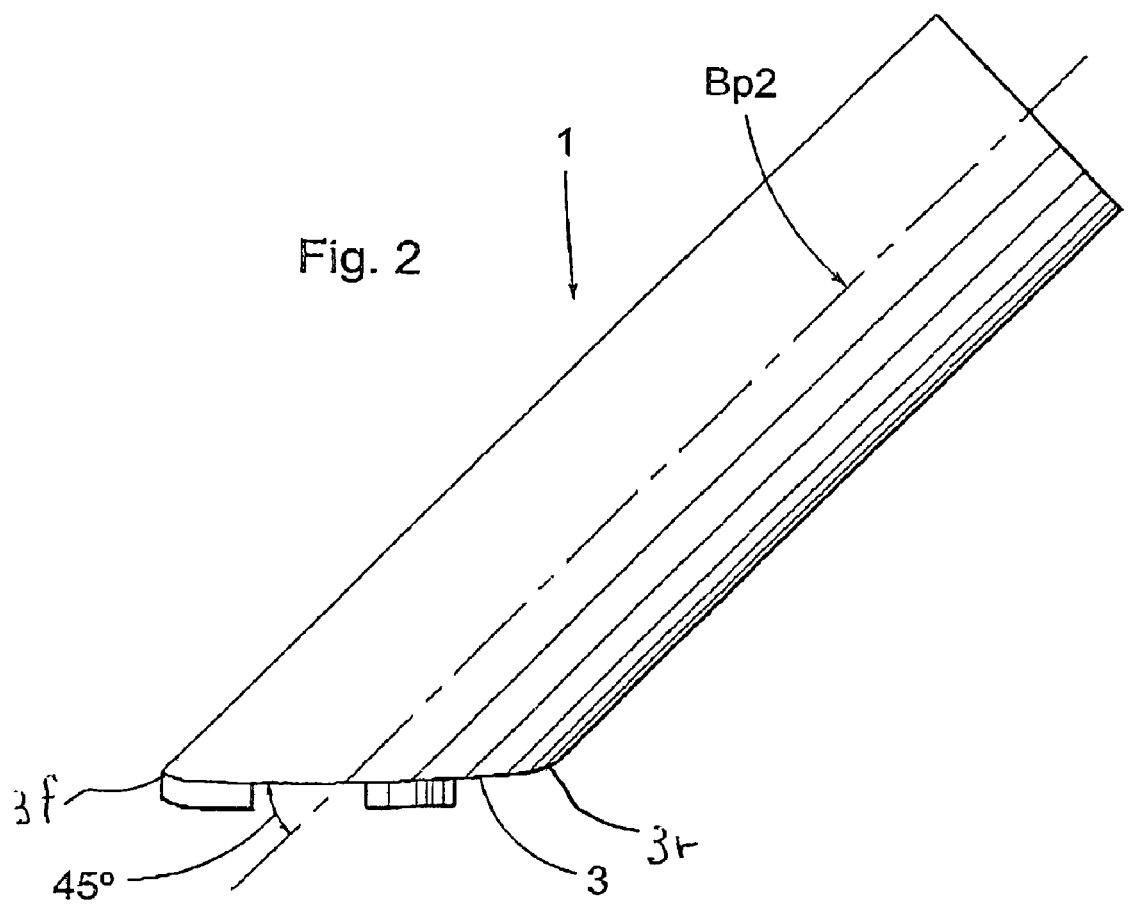
FIG. 2 shows a side view of the insert holder according to FIG. 1.

In FIG. 2, the insert holder 1 is shown in side view, whereby the second basal plane Bp2 is drawn in as a dash-dotted line. The angle of 45° that the support surface 3 forms with the second basal plane Bp2 is drawn in FIG. 2.

Figure 3:
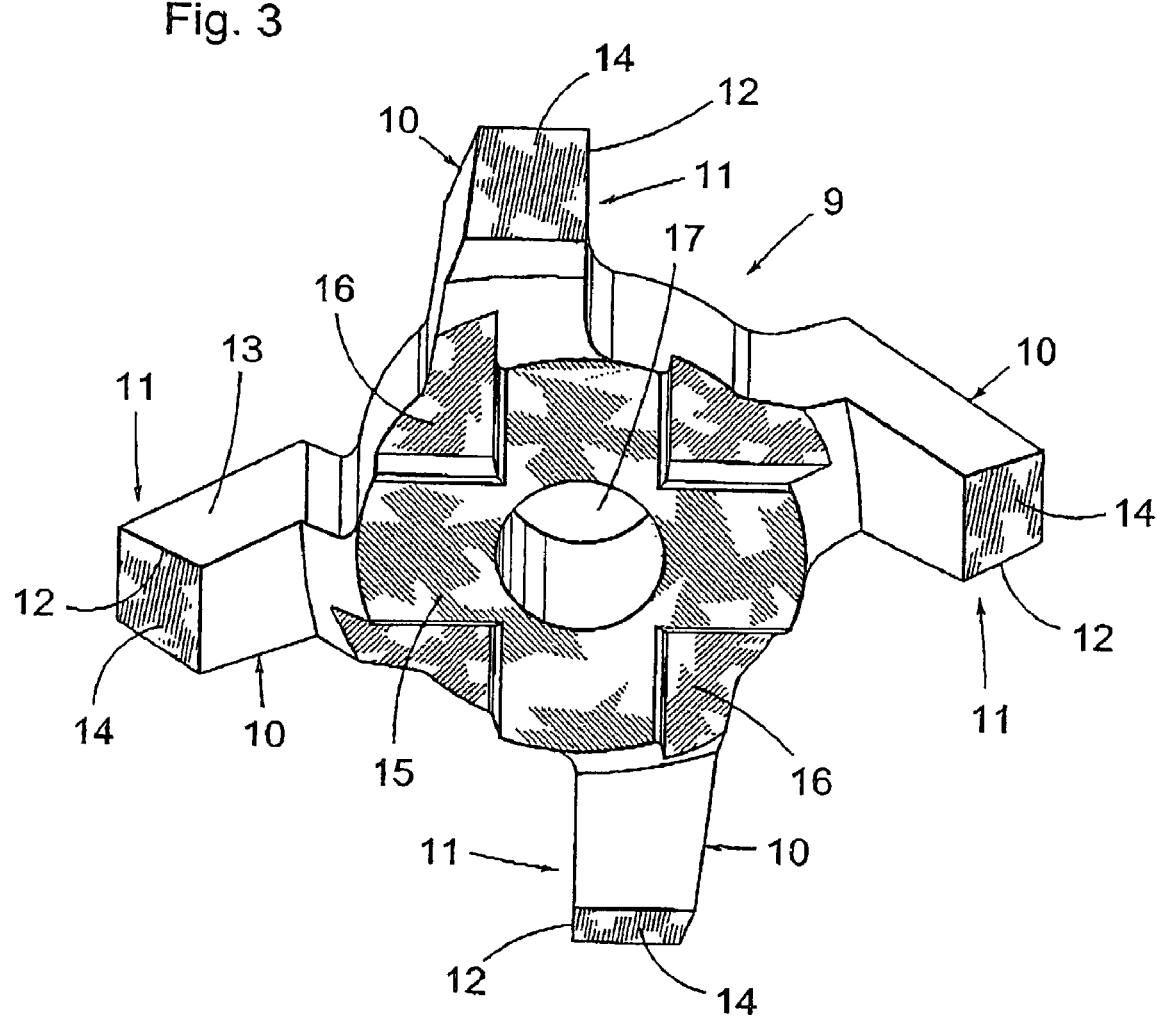
FIG. 3 shows a first embodiment of a cutting insert according to the present invention in perspective from below.
Figure 4:
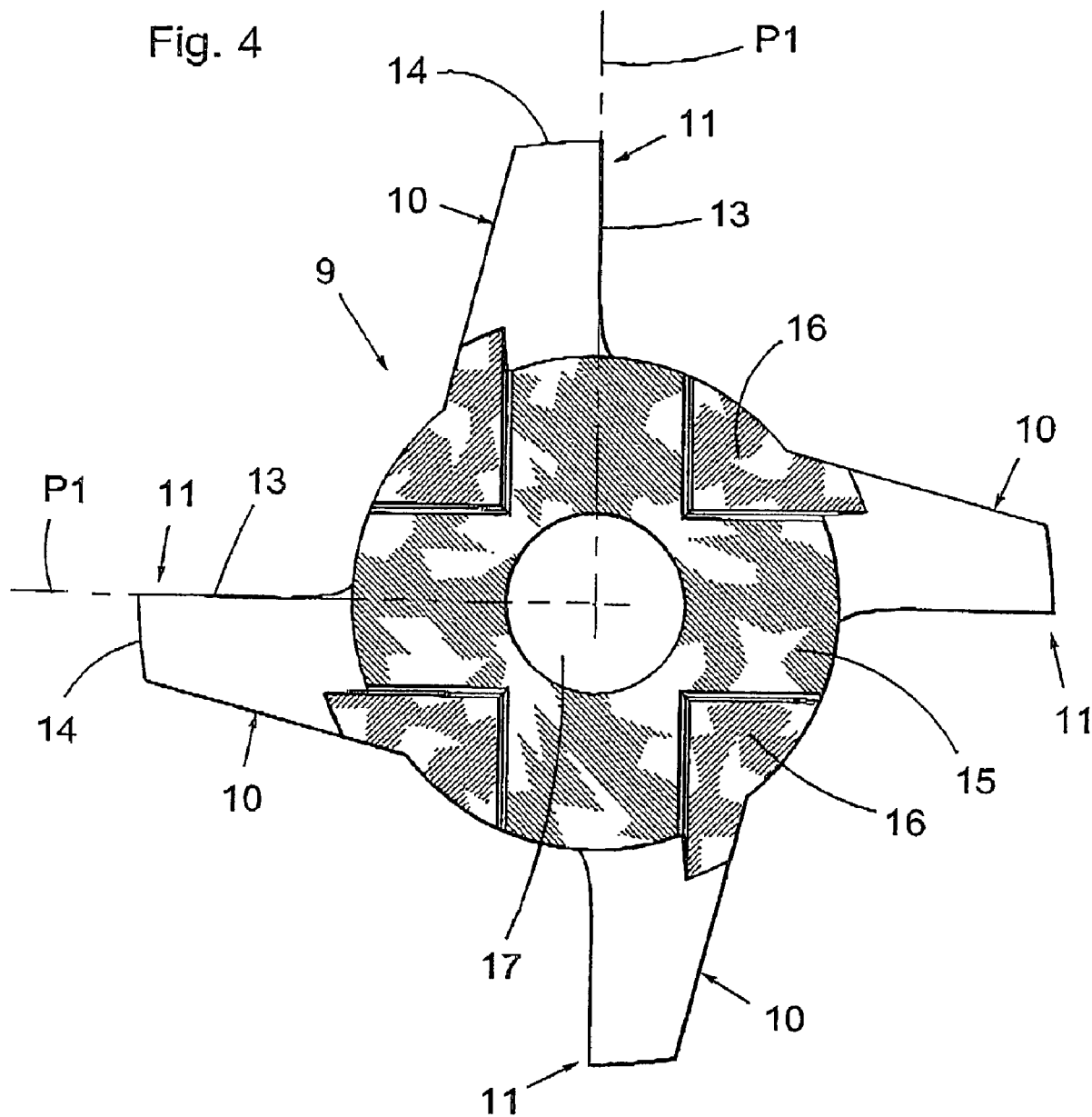
FIG. 4 shows a bottom view of the cutting insert according to FIG. 3.

The cutting insert 9 illustrated in FIGS. 3 and 4 comprises a body having a mounting portion from which project four fingers 10, each one of which carries an edge portion 11. Each edge portion 11 comprises a cutting edge 12, a chip surface 13, as well as a flank surface 14. The cutting edges are spaced around a center axis A of the insert. The mounting portion of the cutting insert 9 has a through-going, centrally positioned, second hole 17, which is used for clamping the cutting insert 9. The cutting edges 12 are straight, whereby a plane P1 which contains both a cutting edge 12 and an appurtenant chip surface 13, has an extension essentially through the center of the second hole 17, whereby the planes P1 have an extension in the axial direction of the second hole 17. This is most clearly seen in FIG. 4, where the planes P1 are marked by dash-dotted lines and have an extension which is perpendicular to the paper in FIG. 4. The cutting insert 9 also has a contact surface 15, which is provided with four countersinks 16, which in the mounted position of the cutting insert 9 on the insert holder 1 are intended to receive the shoulders 5 of the support surface 3 of the insert seat of the insert holder 1, i.e., the support surface 3 and the contact surface 15 are complimentarily formed. By studying the support surface 3 and the contact surface 15, it is realized that the cutting insert 9 may be indexed in four different positions on the insert holder 1. During each indexing, some of the cutting edges are displaced forwardly and some rearwardly due to the 45 degree angle between the respective center axes of the holder and the insert.

Figure 5:
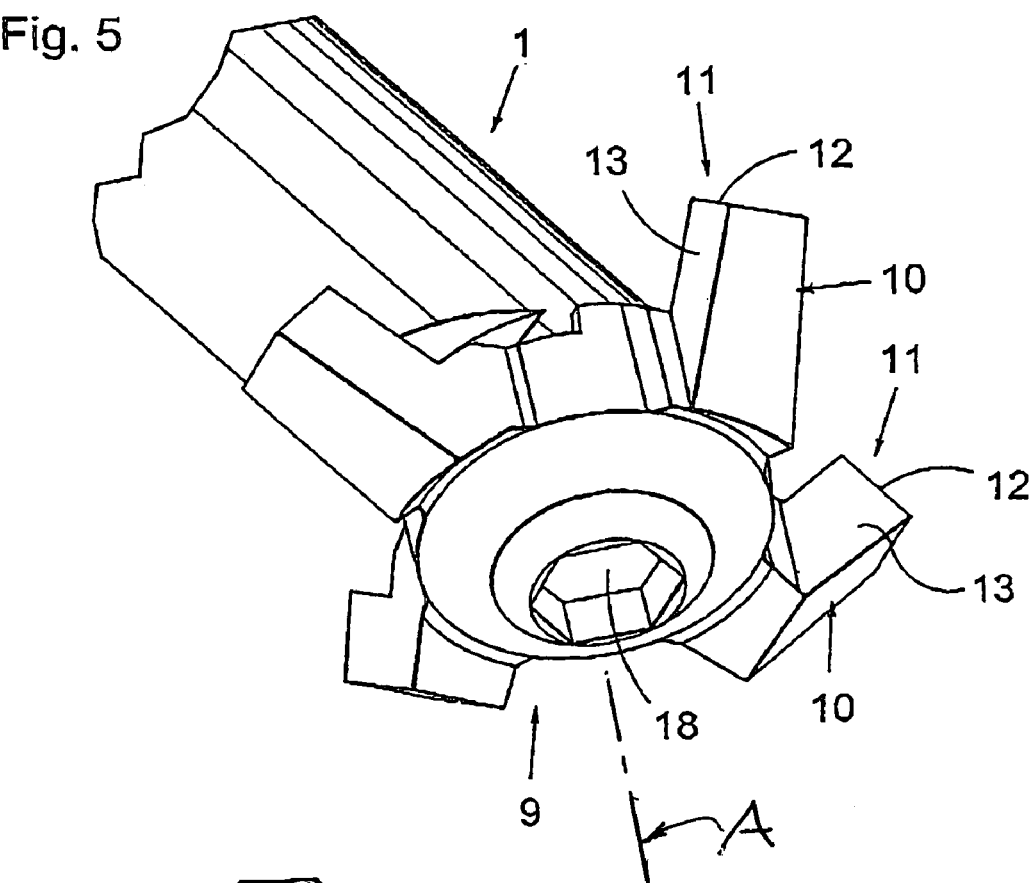
FIG. 5 shows a perspective view of a first embodiment of a tool according to the present invention, which is equipped with the cutting insert according to FIGS. 4 and 5.

The tool according to the present invention illustrated in FIG. 5 comprises the insert holder 1, the cutting insert 9, and the clamping screw 18, which extends through the centrally located second hole 17 in the cutting insert 9 and is anchored in the first hole 7 of the insert holder 1. The cutting insert 9 has four fingers 10, which generally extend obliquely rearwards in the direction towards the insert holder 1.

Figure 6:
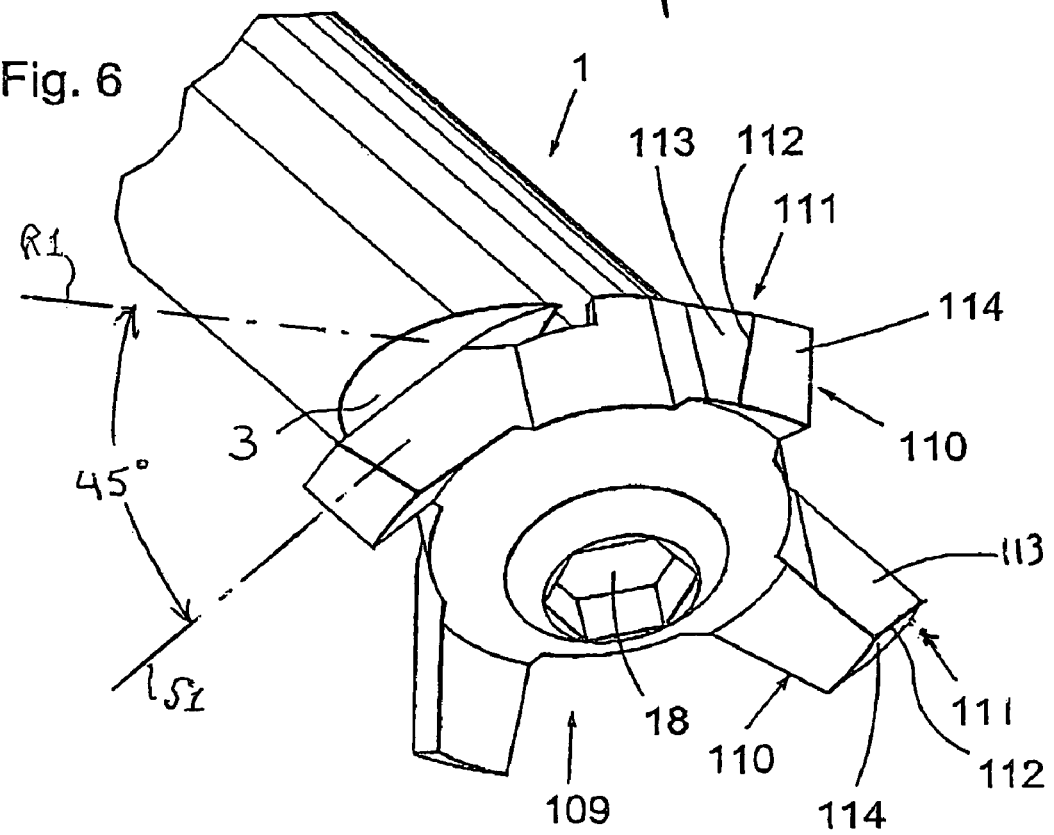
FIG. 6 shows a perspective view of a second embodiment of a tool according to the present invention.

The tool according to the present invention illustrated in FIG. 6 comprises an insert holder 1 as well as a cutting insert 109, which has a surface abutting against the support surface 3 of the insert seat, which in principle corresponds to the corresponding surface 15 of the cutting insert 9. The cutting insert 109 also has four fingers 110, which generally have an extension obliquely forwards, i.e., away from the insert holder 1. Correspondingly to the cutting insert 9, each finger 110 has an edge portion 111 with a cutting edge 112, a chip surface 113, as well as a flank surface 114. A plane which contains the cutting edge 112 and the respective flank surface 113 has an extension essentially through the center of the hole 17/screw 18, whereby such plane P1 has an extension in the axial direction of the screw 18 as well as perpendicularly to the paper in FIG. 6. A symmetry line (bisector) S1 for the edge portion 111, lying in the chip surface 113, and extending perpendicularly to the respective cutting edge 112, forms an angle of 45° with a reference line R1 which lies in the support surface 3 as well as in the same plane as the chip surface 113. A corresponding angle exists in the cutting insert according to FIGS. 3-5, although the angle has not been depicted in these figures.

The tool according to the present invention illustrated in FIG. 7 comprises an insert holder 1 as well as a cutting insert 209, which has a surface abutting against the support surface 3 of the insert seat which in principle corresponds to the corresponding surface 15 of the cutting insert 9. As has been marked in FIG. 7, the plane P2 of the support surface 3 has an inclination of 45° to a second basal plane Bp2, which is marked by a dash-dotted line in FIG. 7 and has an extension perpendicularly to the paper. The cutting insert 209 also has four fingers 210, which generally have an extension obliquely rearwards, i.e., in the direction towards the insert holder 1. Each finger 210 has an edge portion 211 with a cutting edge 212, a chip surface 213, and a flank surface 214. The cutting edge 212 is bent and the flank surface 214 has a shape adapted to the cutting edge 212. A plane P1 which contains a cutting edge 12, as well as an appurtenant chip surface 213 and which has an extension through the center of the hole 17/screw 18, is marked by a dash-dotted line in FIG. 7, whereby the plane P1 has an extension perpendicularly to the paper in FIG. 7. A symmetry line S2 for the edge portion 211, and situated in the chip surface 213, forms an angle of 45° to a reference line R2 that lies in the plane P2 as well as in the same plane as the chip surface 213. The symmetry line S2 in principle divides the cutting edge 212 in halves and runs perpendicularly to the cutting edge 212 in the point of intersection.

The tool according to the present invention illustrated in FIG. 8 comprises an insert holder 1, a cutting insert 309, as well as a clamping screw 18, which is received in a central hole (not shown) in the cutting insert 309 as well as anchored in a threaded hole (not shown) of the insert holder 1. The cutting insert 309 abuts against a support surface 3 of the insert holder 1, whereby said support surface 3 forms an angle of 45° to a second basal plane Bp2 of the insert holder 1. The basal plane Bp2 is marked by a dash-dotted line, and has an extension perpendicularly to the plane of the paper in FIG. 8. The cutting insert 309 has, as in the case of the above-described cutting inserts, four fingers 310 that generally have an extension obliquely forwards, i.e. in the direction away from the insert holder 1. Each finger 310 has an edge portion 311 with a cutting edge 312, a chip surface 313, and a flank surface 314. The cutting edge 312 consists of two straight portions 312a, 312b, which form a right angle to each other. The appurtenant flank surfaces 314 are planar and connect to the cutting edge 312. A plane P1 which contains a cutting edge 312 as well as an appurtenant chip surface 313 has an extension in the main through the center of the hole 17/screw 18, whereby the plane P1 has an extension in the axial direction of the hole 17/screw 18. Such a plane P1 is marked by a dash-dotted line in FIG. 8, whereby the plane P1 has an extension perpendicularly to the paper in FIG. 8. A symmetry line S3 for the edge portion 311, located in the chip surface 313, forms an angle of 45° to a reference line R3 that lies in the same plane as the support surface 3 as well as in the same plane as the chip surface 313. The symmetry line S3 in principle divides the cutting edge 312 in halves and constitutes the bisector to the straight portions 312a, 312b of the cutting edge 312.

Figure 9:
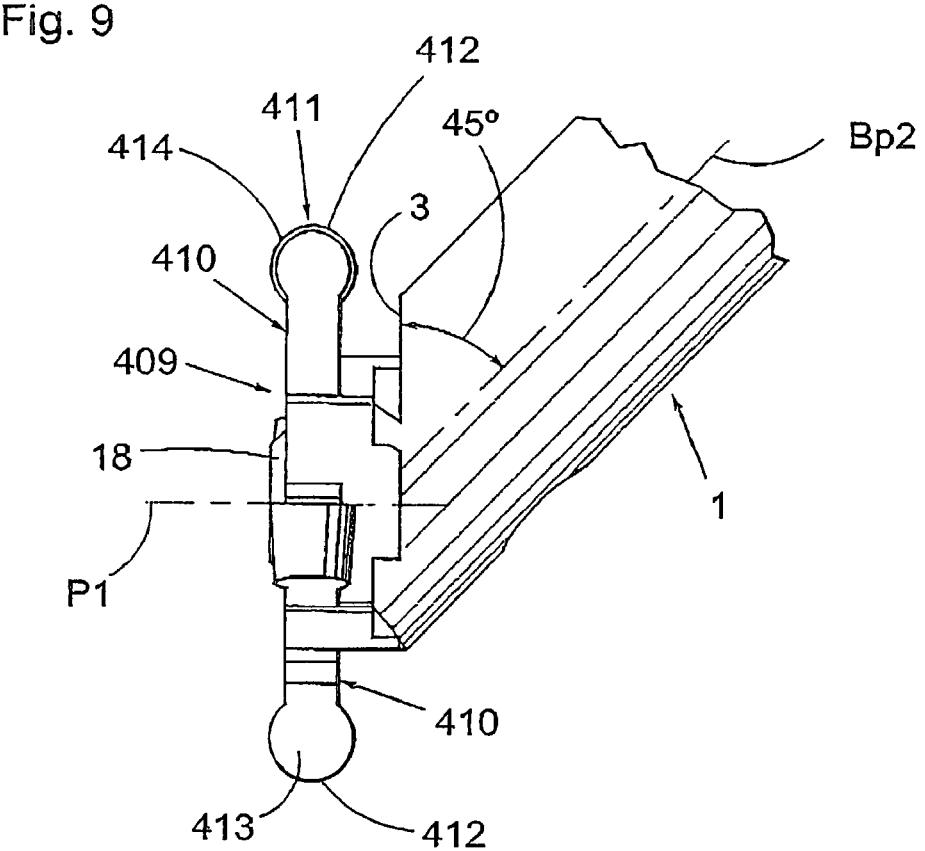
FIG. 9 shows a side view of a fourth embodiment of a tool according to the present invention.

The tool according to the present invention illustrated in FIG. 9 comprises an insert holder 1, a cutting insert 409, as well as a clamping screw 18, which is received in a central hole (not shown) in the cutting insert 409, and anchored in a threaded hole (not shown) of the insert holder 1. The cutting insert 409 abuts against a support surface 3 of the insert holder 1, whereby said support surface 3 forms an angle of 45° to a second basal plane Bp2 of the insert holder 1, whereby the basal plane Bp2 is marked by a dash-dotted line and has an extension perpendicularly to the plane of the paper in FIG. 9. The cutting insert 409 has, as in the case of the above-described cutting inserts, four fingers 410, which generally have an extension parallel to the support surface 3. Each finger 410 has an edge portion 411 with a cutting edge 412, a chip surface 413, and a flank surface 414. The cutting edge 412 is curved and the flank surface 314 has a shape adapted to the cutting edge 312. A plane P1 which contains a cutting edge 312 as well as an appurtenant chip surface 313 has an extension essentially through the center of the hole 17/screw 18, whereby the plane P1 has an extension in the axial direction of the hole 17/screw 18. Such a plane P1 kind is marked by a dash-dotted line in FIG. 9, whereby the plane P1 has an extension perpendicularly to the paper in FIG. 9.

Figure 10:
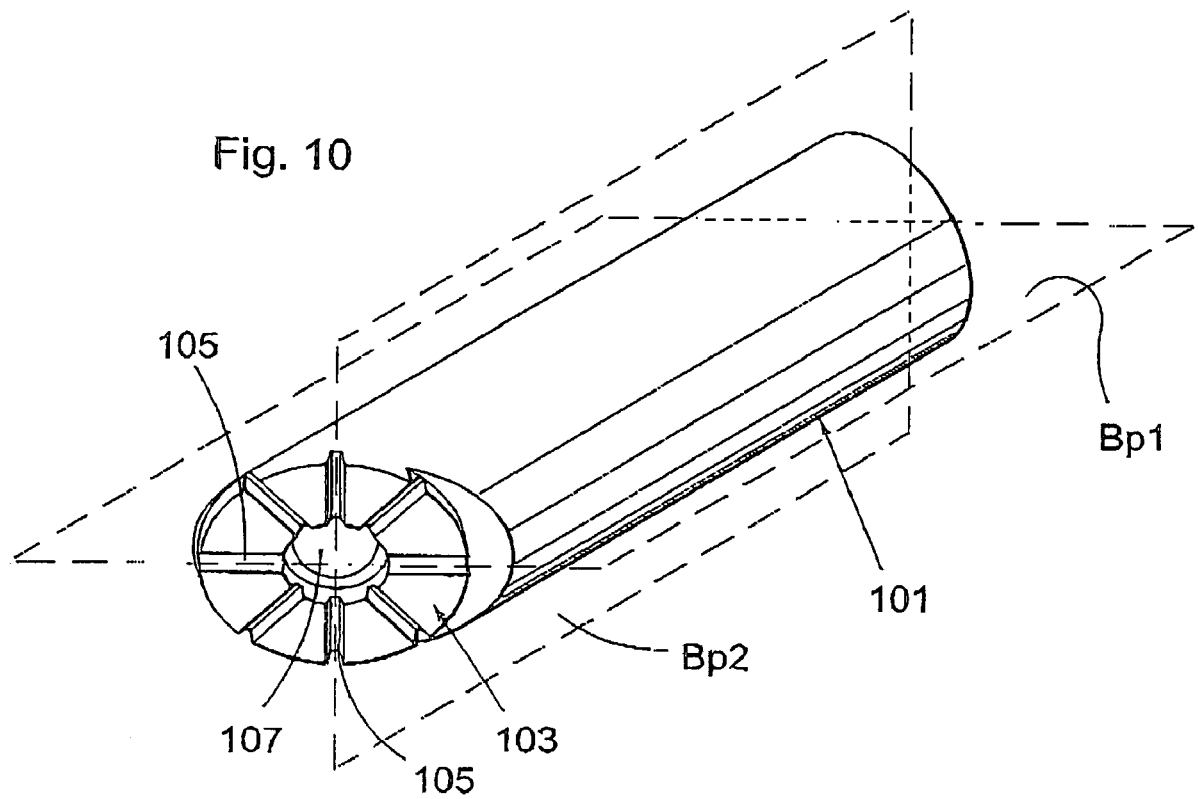
FIG. 10 shows a perspective view of a second embodiment of an insert holder, which is included in a tool according to the present invention.

In FIG. 10, an alternative embodiment of an insert holder 101, especially the support surface 103, is shown. As in the case of the insert holder 1, the support surface 103 forms an angle of 45° to a second basal plane Bp2. As seen in FIG. 10, the support surface 103 has a number of radially extending grooves 105, which extend from the periphery of the support surface 103 to the first hole 107 of the insert holder 101. The cutting insert that is to be clamped on the insert holder 101 has to have a contact surface which is complementary to the support surface 103, i.e., the contact surface has to have ridges that fit into the grooves 105, whereby the number of ridges preferably is equal to the number of grooves 105. Such a cutting insert may be indexed as many times as the number of grooves/ridges.

Figure 11:
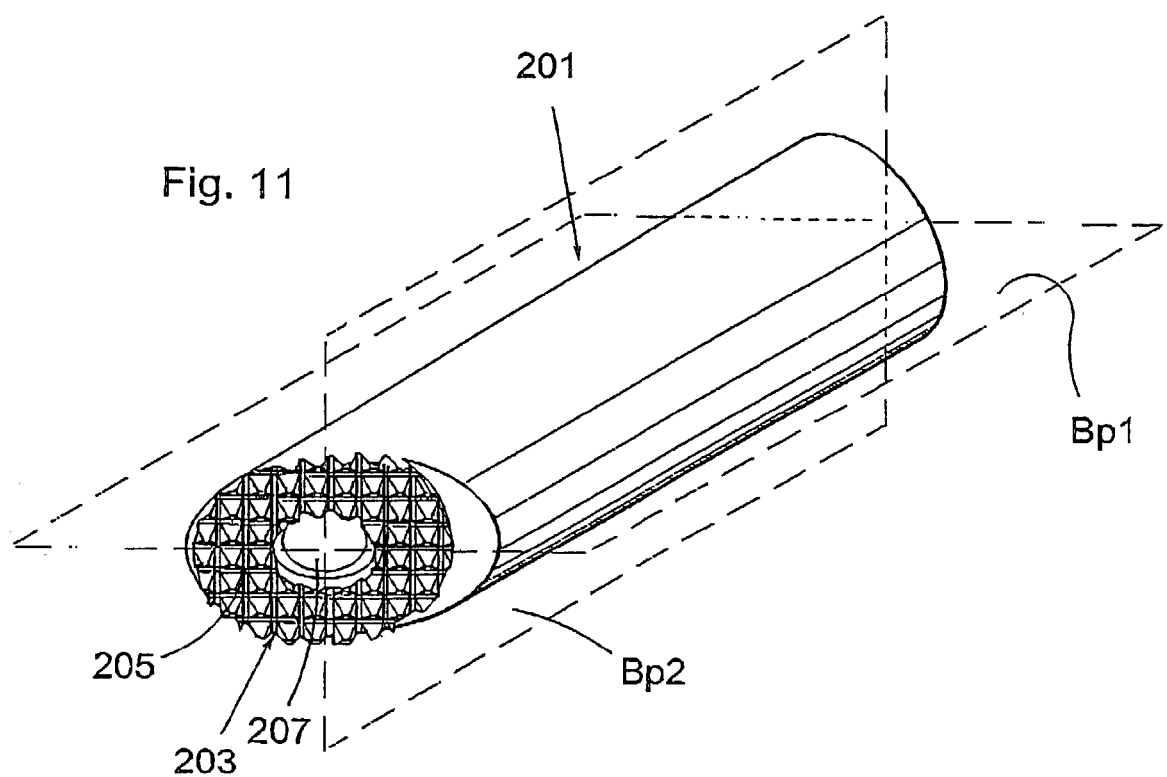
FIG. 11 shows a perspective view of a third embodiment of an insert holder which is included in a tool according to the present invention.

In FIG. 11, an additional alternative embodiment of an insert holders 201 is shown, especially in regards to the support surface 203, which has a waffle-like surface structure 205. The support surface 203 forms an angle of 45° basal plane Bp2. The cutting insert, which should be clamped on the insert holder 201, has to have a contact surface that is complementary to the support surface 203, i.e., the contact surface has to have an inverted waffle-like surface structure. Such a cutting insert may be indexed four times at the clamping thereof against the support surface 203.

Figure 12:
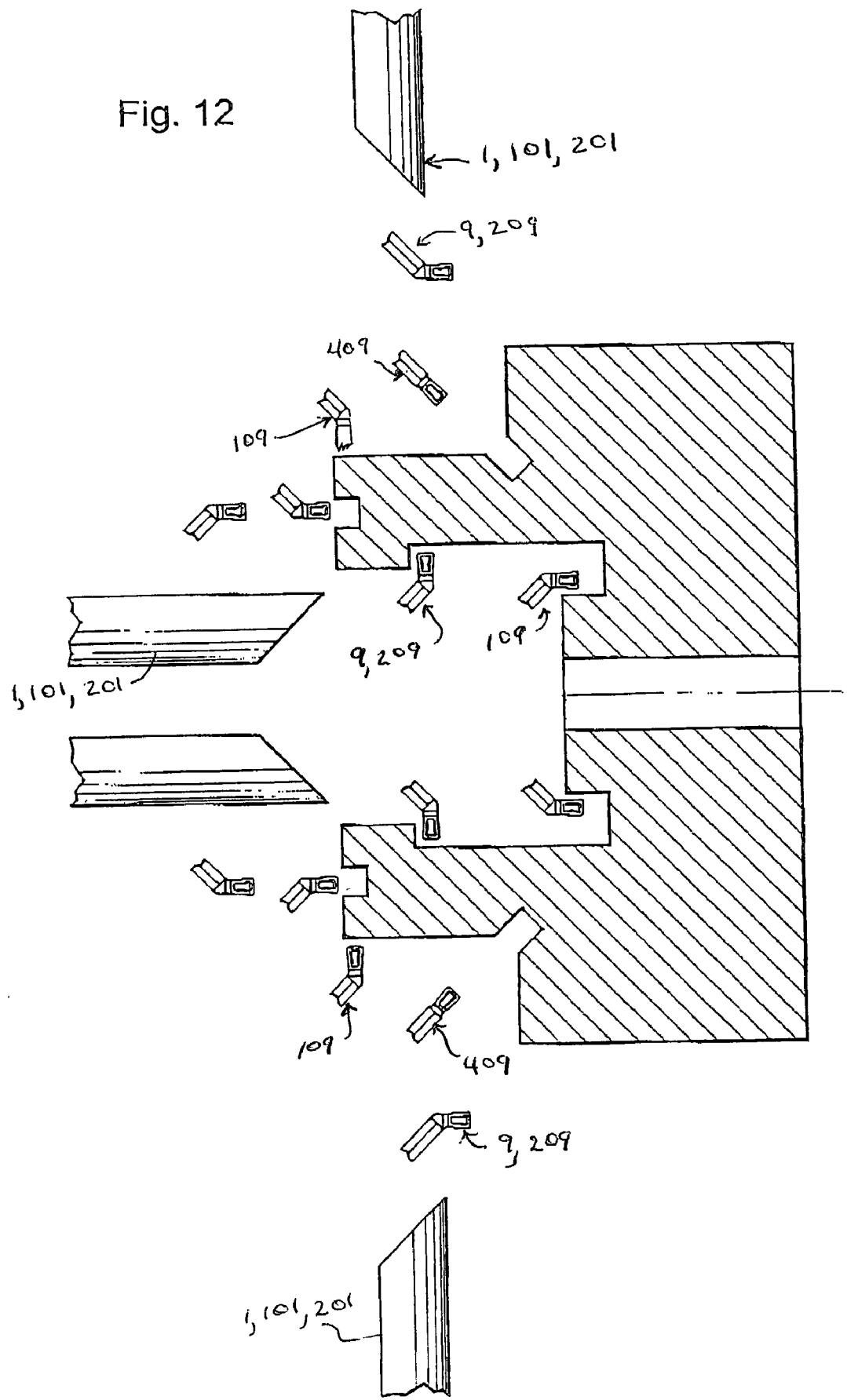
FIG. 12 shows an overview of the various sections of the cutting edge and insert holders according to the present invention, whereby the different types of machining that various sections of the cutting edge may carry out are also indicated.

In FIG. 12, a number of edge portions of cutting inserts according to the present invention are shown schematically. The aim of FIG. 12 is to illustrate that a small number of different holders and cutting inserts, respectively, according to the present invention, ensures a large a number of possible combinations with regard to cutting operations which may be made with tools according to the present invention. Thus, a tool according to the present invention may be used in both internal and external machining, for instance in connection with grooving, longitudinal turning and screw threading.

Feasible Modifications of the Invention

All cutting inserts 9; 109; 209; 309; 409 described above have four fingers 10; 110; 210; 310; 410, each one of which has an edge portion 11; 111; 211; 311; 411. However, either fewer or more fingers are conceivable within the scope of the present invention, whereby the number of fingers is normally in the range of 1–6. Within the scope of the present invention, it is also feasible that one and the same cutting insert has a combination of: fingers which extend obliquely forwards, fingers which extend obliquely rearwards, and fingers which extend purely radially. For instance, such a cutting insert may be a combination of the cutting insert according to FIGS. 3–5 and the cutting insert according to FIG. 6.

In the embodiments of cutting inserts described above, the planes P1 pass in the main through the center of the second hole 17/clamping screw 18. However, it is conceivable within the scope of present invention that, for instance, the chip surface 13; 113; 213; 313; 413 is given such a direction that the planes P1 are offset from said center. However, the planes P1 should extend inwards towards the central portion of the cutting insert 9; 109; 209; 309; 409 and have an extension in the axial direction of the central hole 17 of the cutting insert 9; 109; 209; 309; 409.

In the embodiments described above, the cutting inserts 9; 109; 209; 309; 409 are clamped by means of a clamping screw 18. However, alternative clamping members are conceivable within the scope of the present invention, whereby an expanding drawbar may be mentioned in an exemplifying and not limiting purpose.

The above-described engagement members 5, 105, 205 with which the support surface 3; 103; 203 are provide, only constitute examples. Within the scope of the present invention, a plurality of alternative engagement members are feasible, whereby, however, it is important that the cutting inserts are provided with complementary engagement members.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A cutting insert for chip removing machining, comprising a mounting portion for mounting to a holder, a cutting edge spaced from the mounting portion, a chip surface disposed adjacent the cutting edge, and a center through-hole extending through the mounting portion and defining a longitudinal axis, wherein a plane containing both the chip surface and the cutting edge extends longitudinally through the mounting portion adjacent the axis, wherein the mounting portion includes a contact surface for mounting the insert to a holder, wherein a first imaginary line lying in the chip surface and bisecting the cutting edge forms a 45-degree angle with a second imaginary line lying in a plane defined by the contact surface.

2. The cutting insert according to claim 1 wherein the axis lies in the plane.

3. The cutting insert according to claim 1 wherein the mounting portion includes a contact surface from which engagement members project.

4. The cutting insert according to claim 1 further including fingers projecting from the mounting portion in generally radial directions with respect to the axis, each finger including a cutting edge disposed on an outer end thereof, and a chip surface disposed adjacent the cutting edge.

5. A cutting insert for chip removing machining comprising a mounting portion including a contact surface for mounting the insert to a holder, the contact surface including engagement members projecting therefrom; a plurality of fingers projecting generally radially with respect to a longitudinal center axis of the mounting portion, each finger terminating in a cutting edge and including a chip surface disposed adjacent to the cutting edge, wherein a plane containing both the chip surface and the cutting edge extends longitudinally through the mounting portion adjacent the axis; a first imaginary line lying in the chip surface and bisecting the cutting edge forming a 45-degree angle with a second imaginary line lying in a plane defined by the contact surface.

6. A tool for chip removing machining comprising an insert holder and a cutting insert attached thereto, wherein the insert includes a body having at least one cutting edge formed as an integral non-removable part of the body, the holder including a longitudinal center axis and termination in a support surface at a front end of the holder; the support surface defining a seat to which the insert body is directly removably attached; the support surface forming a 45-degree angle with the center axis, wherein the support surface includes engagement members engaging complementary engagement members of the insert body, the insert body including a center through-hole through which a clamping member extends, the engagement members arranged symmetrically around the through-hole, the insert body further including a chip surface for the at least one cutting edge, wherein a plane containing both the chip surface and the cutting edge extends longitudinally through the holder adjacent the center axis.

* * * * *